United States Patent
Sun et al.

(10) Patent No.: US 12,088,224 B2
(45) Date of Patent: Sep. 10, 2024

(54) FINITE TIME SPEED CONTROL METHOD FOR PERMANENT MAGNET SYNCHRONOUS MOTOR BASED ON FAST INTEGRAL TERMINAL SLIDING MODE AND DISTURBANCE ESTIMATION

(71) Applicant: DALIAN UNIVERSITY OF TECHNOLOGY, Liaoning (CN)

(72) Inventors: Ximing Sun, Liaoning (CN); Jianyi Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 242 days.

(21) Appl. No.: 17/640,216

(22) PCT Filed: May 6, 2021

(86) PCT No.: PCT/CN2021/091849
§ 371 (c)(1),
(2) Date: Mar. 3, 2022

(87) PCT Pub. No.: WO2022/232977
PCT Pub. Date: Nov. 10, 2022

(65) Prior Publication Data
US 2023/0246578 A1    Aug. 3, 2023

(51) Int. Cl.
*H02P 6/18* (2016.01)
*H02P 21/00* (2016.01)
*H02P 21/18* (2016.01)
*H02P 25/022* (2016.01)

(52) U.S. Cl.
CPC .......... *H02P 21/0007* (2013.01); *H02P 21/18* (2016.02); *H02P 25/022* (2013.01); *H02P 2207/05* (2013.01)

(58) Field of Classification Search
CPC ...... H02P 21/007; H02P 21/18; H02P 25/022; H02P 2207/05
See application file for complete search history.

(56) References Cited

FOREIGN PATENT DOCUMENTS

| CN | 103838237 A | * | 6/2014 |
|---|---|---|---|
| CN | 104300863 A | | 1/2015 |
| CN | 109067274 A | | 12/2018 |
| CN | 112072973 A | | 12/2020 |
| CN | 113206623 A | | 8/2021 |

* cited by examiner

*Primary Examiner* — Karen Masih
(74) *Attorney, Agent, or Firm* — Muncy, Geissler, Olds & Lowe, P.C.

(57) ABSTRACT

A finite time speed control method for a permanent magnet synchronous motor (PMSM) based on a fast integral terminal sliding mode and disturbance estimation comprises: firstly, determining a mathematical model of a speed loop of the PMSM under the influence of system parameters uncertainty and unknown load torque; secondly, designing an improved fast integral terminal sliding surface on the basis of the idea of terminal sliding mode control; then, proposing a disturbance estimation method based on an adaptive fuzzy system with respect to the disturbance in a PMSM system; designing a PMSM speed controller on this basis; and finally, completing the concrete implementation of the whole technical solution. The present invention designs the fast integral terminal sliding surface and a sliding mode control law to ensure that a motor speed tracking error converges to zero within finite time and enhances the rapidity of a PMSM speed regulating system.

2 Claims, 8 Drawing Sheets

FINITE TIME SPEED CONTROL METHOD FOR PERMANENT MAGNET SYNCHRONOUS MOTOR BASED ON FAST INTEGRAL TERMINAL SLIDING MODE AND DISTURBANCE ESTIMATION

TECHNICAL FIELD

The present invention belongs to the technical field of speed control of a permanent magnet synchronous motor, and more particularly relates to a finite time speed control technology for a permanent magnet synchronous motor (PMSM) based on a fast integral terminal sliding mode and disturbance estimation, which can realize the finite time tracking of motor speed, and can effectively overcome the influence of internal and external system disturbances including system parameters uncertainty and unknown load torque fluctuation.

BACKGROUND

The PMSM is a kind of motor that uses a permanent magnet as a rotor. It provides an excitation magnetic field through the permanent magnet and eliminates an excitation coil, thereby simplifying the motor structure, reducing the motor quality and volume and effectively improving the efficiency, power density and reliability of the motor. The PMSM is widely used in many fields of electric vehicles, industrial production and aerospace because of the above advantages.

In the technical field of the traditional PMSM speed control, the PI control algorithm occupies the main position because of the advantages of simple structure and convenient adjustment. However, the influence of disturbance caused by many factors of parameters uncertainty and load fluctuation exists in the motor control system inevitably. The PI algorithm has no strong robustness and excellent anti-disturbance capability. Under system disturbances, the control performance is greatly reduced, and the PI algorithm cannot satisfy the requirements of modern industrial application for the PMSM speed control technology with high accuracy and strong anti-disturbance capability.

To improve the anti-disturbance capability of the PMSM speed control system, numerous scholars begin to focus on the research of the control algorithms with strong robustness. Sliding mode control is one of the most popular control algorithms, with the main idea of designing a sliding surface irrelevant to system parameters and disturbance and "forcing" the system states to move along the designed sliding surface through a sliding mode controller so that the control system has strong anti-disturbance capability. It should be pointed out that sliding mode control has some defects. Namely, after the system state reaches the sliding surface, it is difficult to strictly slide to the equilibrium point along the sliding surface, but the system state approaches the equilibrium point across both sides of the sliding surface, to produce chattering. This is one of the most important obstacles in the practical application of sliding mode control. At the same time, in addition to strong anti-disturbance capability, the speed tracking capability of the PMSM is also an important indicator to test the quality of the speed regulation algorithm, because higher adjustment speed and better tracking accuracy mean higher work efficiency. The traditional sliding mode control method can only achieve asymptotic convergence. That is, when the time is infinite, the motor speed tracks the target value, but cannot ensure convergence in finite time. For example, in the paper "Xie Tao, Gao Guige and Wang Jie. Research on PMSM Vector Control System Based on Sliding Mode Controller [J]. Electric Machines & Control Application, 2018.", a PMSM speed control method based on sliding mode control is proposed. However, the control method can only achieve a control effect of asymptotic convergence in theory, and cannot determine the time taken for the motor speed to track the target value, that is, it cannot ensure that the motor speed can track the target value in finite time.

In addition, in the prior art, some technical solutions use actually-unavailable signals such as motor acceleration and jerk during controller design in order to achieve a target control effect. For example, in the paper "Tong Linghua. Fast High Order Terminal Sliding Mode Control of PMSM [J]. Electric Machines & Control Application, 2016.", during controller design, the acceleration signal of the motor is used, but is difficult to be measured through the sensors, which means that such technical solutions cannot be directly applied in practice. The realizability of the technical solutions is the determining factor for industrial application.

To sum up, the existing technologies including PI control and sliding mode control cannot simultaneously satisfy the requirements of modern PMSM speed control system in rapidity, accuracy and anti-disturbance capability, so it is urgent to propose a new high-performance control method.

SUMMARY

To overcome the defects and deficiencies existing in a speed control method for a permanent magnet synchronous motor in prior art, the present invention provides a finite time speed control technology for a permanent magnet synchronous motor based on a fast integral terminal sliding mode and disturbance estimation. The method designs a fast integral terminal sliding surface and a sliding mode control law to ensure that a motor speed tracking error converges to zero within finite time and enhances the rapidity of a permanent magnet synchronous motor (PMSM) speed regulating system. At the same time, the method uses an adaptive fuzzy algorithm to online estimate and compensate the internal and external system disturbance in real time, which further enhances the robustness and anti-disturbance capability of the speed regulating system, effectively reduces the switching gain of a sliding mode control item and further weakens a chattering phenomenon.

To achieve the above purpose, the present invention adopts the following technical solution: A finite time speed control method for a permanent magnet synchronous motor (PMSM) based on a fast integral terminal sliding mode and disturbance estimation, comprising: firstly, determining a mathematical model of a speed loop of the PMSM under the influence of system parameters uncertainty and unknown load torque; secondly, designing an improved fast integral terminal sliding surface on the basis of the idea of terminal sliding mode control, which can improve the convergence time of the traditional integral terminal sliding surface and ensure that the motor speed tracking error can converge to zero in a finite time when located on the sliding surface; then, proposing a disturbance estimation method based on an adaptive fuzzy system with respect to the disturbance in a PMSM system, which can realize real-time estimation of system disturbance by online adaptive adjustment of a fuzzy network weight without off-line calculation; on this basis, further designing the PMSM speed controller based on the fast integral terminal sliding mode and adaptive fuzzy disturbance estimation, proving that the proposed method can realize fast adjustment of motor speed in finite time through rigorous theoretical analysis, and effectively suppressing the influence of system disturbance; and finally, completing the concrete implementation of the whole technical solution. The method comprises the following specific steps:

S1. determining a mathematical model of a speed loop of the PMSM under the influence of system parameters uncertainty and unknown load torque;

in a d-q coordinate system, a mathematical model of a speed loop of a non-salient pole permanent magnet synchronous motor is:

$$\dot{\omega} = \frac{K_t}{J}i_q - \frac{B}{J}\omega - \frac{T_L}{J}$$

where $\omega$ is motor speed; $i_q$ represents stator current of q axis; $K_t$ is a torque constant; J represents the moment of inertia; B is a viscous friction coefficient; and $T_L$ represents a load torque.

Further considering the influence of system parameters uncertainty, unknown load torque and current loop tracking error, and rewriting the mathematical model of the speed loop of the PMSM as:

$$\dot{\omega} = \frac{K_t}{J_n}i_q^* - \frac{B_o + \Delta B}{J_n + \Delta J}\omega + \left(\frac{K_t}{J} - \frac{K_t}{J_n}\right)i_q - \frac{T_L}{J} + \frac{K_t}{J_n}(i_q - i_q^*)$$

In the formula, $B_o$ and $J_n$ represent the nominal values of viscous friction coefficient and the moment of inertia respectively; $\Delta B = B - B_o$ and $\Delta J = J - J_n$ represent deviations between true values and the nominal values of the viscous friction coefficient and the moment of inertia; and $i_q^*$ represents a reference value of the stator current of the q axis, i.e., a PMSM speed controller to be designed.

Further processing the mathematical model of the speed loop of the PMSM which considers the system disturbance to obtain:

$$\dot{\omega} = ai_q^* + d$$

in the formula, d(t) represents a lumped disturbance term of which the expression is $$d = -\frac{B_o + \Delta B}{J_n + \Delta J}\omega + \left(\frac{K_t}{J} - \frac{K_t}{J_n}\right)i_q - \frac{T_L}{J} + \frac{K_t}{J_n}(i_q - i_q^*); a = \frac{K_t}{J_n};$$

since the torque constant $K_t$ and the nominal value $J_n$ of the moment of inertia are known, a is a known constant coefficient;

S2. Constructing a fast integral terminal sliding surface:
firstly, defining a speed tracking error: $e = \omega - \omega_d$, where $\omega_d$ represents motor target speed.

Then, designing the fast integral terminal sliding surface as: $s = e + \alpha\int_0^t e d\sigma + \beta\int_0^t e^{q/p} d\sigma$; where $\alpha, \beta > 0$, which are constant coefficients; $0 < q/p < 1$; and q and p are positive odd numbers.

When the tracking error of the motor speed converges to the sliding surface, S=0, i.e., $e = -\alpha\int_0^t e d\sigma - \beta\int_0^t e^{q/p} d\sigma$;
taking the derivative of the above to obtain $\dot{e} = -\alpha e - \beta e^{q/p}$;
solving the above equation to obtain the time for the tracking error of the motor speed to converge to zero from reaching the sliding surface:

$$t_s = \frac{p}{\alpha(p-q)}\left(\ln\left[\alpha e(0)^{(p-q)/p} + \beta\right] - \ln\beta\right)$$

S3. Conducting disturbance estimation on the lumped disturbance term based on an adaptive fuzzy system:
estimating the lumped disturbance term d(t) defined in step S1 by the fuzzy system, and according to the universal approximation theorem of the fuzzy system, an optimal fuzzy system $\overline{\Phi}^T H(x)$ exists, so that:

$$d = \overline{\Phi}^T H(x) + \varepsilon$$

in the formula, $\overline{\Phi} = [\overline{\phi}_1, \overline{\phi}_2, \ldots, \overline{\phi}_r]^T$ is a weight vector at optimal approximation, and r is the number of fuzzy rules; $\varepsilon$ represents an estimation error which satisfies $|\varepsilon| < \rho$; $\rho > 0$ is a positive constant; the value of $\varepsilon$ can be infinitely reduced by increasing the number of the fuzzy rules; $x = [x_1, x_2, \ldots, x_n]^T$ is an input vector of the fuzzy system, and n is the number of fuzzy inputs; in the technical solution proposed by the present invention, the fast integral terminal sliding surface and the speed tracking error are selected as the inputs of the fuzzy system, i.e., $x = [s, e]^T$, and $H(x) = [h_1(x), h_2(x), \ldots, h_r((x))]^T$ represents a fuzzy basis function vector, and:

$$h_i(x) = \frac{\prod_{k=1}^n \mu_{A_k^i}(x_k)}{\sum_{i=1}^r \left[\prod_{k=1}^n \mu_{A_k^i}(x_k)\right]}, i = 1, \ldots, r$$

where $\mu_{A_k^i}(x_k)$ represents a membership function value of a fuzzy variable.

Since the weight vector $\overline{\Phi}$ in optimal approximation cannot be obtained directly, estimating $\overline{\Phi}$; making $\hat{\Phi}$ represent the estimated value of $\overline{\Phi}$; and based on an adaptive theory, designing the online adaptive weight adjustment rate of the fuzzy system as:

$$\dot{\hat{\Phi}} = \Gamma H(x)s$$

where $\Gamma \in R^{r \times r}$ is a positive definite symmetric matrix; and s represents the fast integral terminal sliding surface constructed in step S2.

After obtaining the estimated value $\hat{\Phi}$ of $\overline{\Phi}$ according to the above adaptive weight adjustment rate, using $\hat{\Phi}^T H(x)$ to estimate the lumped disturbance term d (t) online.

S4. Designing the PMSM speed controller:
designing the following form of PMSM speed controller based on steps S2 and S3:

$$i_q^* = \frac{1}{a}\left[\dot{\omega}_d - \hat{\Phi}^T H(x) - \alpha e - \beta e^{q/p} - k_1 s - k_2 \text{sign}(s)\right]$$

in the formula, $k_1$ and $k_2$ are positive adjustable control gains; $k_2 > 1 + \rho$; $1 > 0$ is the upper bound of $\Phi^T H(x)$, i.e., $|\hat{\Phi}^T H(x)| < 1$; $\tilde{\Phi} = \overline{\Phi} - \hat{\Phi}$ represents a weight estimation error vector; and sign(s) represents a signum function.

With the PMSM speed controller designed by the present invention, making the speed tracking error converge to the sliding surface in time $t_o$, with $t_o$, satisfying the following relational expression:

$$t_o \leq \frac{1}{\lambda}|s(0)|$$

in the formula, $\lambda=k_2-\rho-1$, which represents the constant coefficient; and s(0) represents the value of the fast integral terminal sliding surface s constructed in step S2 at time of 0.

S5. Specifically realizing the technical solution:
5.1) Firstly, measuring the motor speed ω in real time through a sensor installed in the PMSM, and after obtaining a motor speed signal ω, making a difference between the signal and the motor target speed $\omega_d$ to obtain a speed tracking error e; after obtaining e, further obtaining the value of the fast integral terminal sliding surface s; and meanwhile, based on step S3, obtaining a disturbance estimation value $\hat{\Phi}^T H(x)$ outputted by the adaptive fuzzy system.
5.2) Secondly, substituting the speed tracking error e, the fast integral terminal sliding surface s and the disturbance estimation value $\hat{\Phi}^T H(x)$ into the PMSM speed controller given in step S4, and using the controller as a speed loop controller under a PMSM vector control frame to generate a reference value $i_q^*$ of stator current of the q axis.
5.3) In a current loop, obtaining the voltage in the d–q coordinate system according to the input stator current reference value using a classical PI controller, obtaining a voltage signal in a static coordinate system through inverse Park transformation, then generating a corresponding duty cycle through a SVPWM algorithm, and obtaining a switch signal of a three-phase inverter; outputting PMSM three-phase stator voltage by the three-phase inverter, and then controlling the motor speed to track the target speed to realize the whole motor speed regulation process.

With the method of the present invention, the time used in the whole motor speed regulation process is finite, so as to realize the finite time tracking of motor speed. Combining with the time $t_s$ taken for the motor speed tracking error to converge to zero on the designed fast integral terminal sliding surface obtained in step S2 and the time $t_o$, taken for the motor speed tracking error to converge to the sliding surface obtained in step S4, it can be obtained that the time for motor speed tracking error converges to zero from an initial state, i.e., time $t_r$ taken for the motor to reach the target speed, which satisfies:

$$t_r = t_o + t_s \leq \frac{1}{\lambda}|s(0)| + \frac{p}{\alpha(p-q)}\left(\ln\left[\alpha e(i)^{(p-q)/q} + \beta\right] - \ln \beta\right).$$

Compared with the prior art, the present invention has the following beneficial effects:

(1) Finite time control: in the prior art, most control methods can only ensure the asymptotic convergence of the motor speed tracking error, i.e., when the time tends to be infinite, the speed tracking error converges to zero, but cannot ensure the finite time convergence. For the terminal sliding mode control, the finite time convergence of system states can be realized by introducing nonlinear terms into the sliding surface. The present invention designs a novel fast integral terminal sliding surface based on the idea of terminal sliding mode control, solves the problem of low convergence rate of the traditional integral terminal sliding surface and further shortens the time taken for the speed tracking error to converge to zero. At the same time, the traditional terminal sliding mode control can only ensure that the time of the sliding phase of the system is finite, and fails to analyze the convergence time of an reaching phase in detail. In the present invention, the rigorous theoretical analysis process proves that the proposed method can ensure the time finiteness of the whole motor speed regulation process, i.e., the time taken for the system states in the reaching phase and the sliding phase is finite, which effectively improves the rapidity of the PMSM speed regulating system.

(2) Disturbance estimation and suppression: in the PMSM system, the disturbance influences caused by system parameters variation and unknown load fluctuation are inevitable. How to suppress the disturbance influences is the key and difficulty in the design of the PMSM control system. The present invention proposes a method for adaptive fuzzy disturbance estimation through the universal approximation theorem of the fuzzy system, which can conduct online estimation and real-time compensation for the disturbance without making too many theoretical assumptions in advance like other disturbance estimation methods. At the same time, the uncertainty in the system can be greatly reduced by compensating the system disturbance, which means that the sliding mode gains in the controller do not need to be excessively selected, thereby effectively weakening system chattering.

(3) Solution realizability: in the prior art, some technical solutions use actually-unavailable signals such as motor acceleration and jerk during controller design in order to achieve a target control effect, which means that such technical solutions cannot be directly applied in practice. In the method proposed by the present invention, the used system state signals can be obtained directly by corresponding sensors, i.e., all the signals are valid signals, thereby ensuring the realizability of the proposed technical solution and indicating that the method can be directly applied to practical industrial production.

In conclusion, compared with the prior art, the PMSM speed control technology proposed by the present invention can realize the finite time convergence of the speed tracking error, which ensures that the motor can reach the target speed in finite time, improves the rapidity of the PMSM speed regulating system, simultaneously realizes online estimation and real-time compensation on system disturbance and effectively overcomes the internal and external disturbance influences in the PMSM system. More importantly, the system state signals used in the technical solution proposed by the present invention are all measurable signals, that is, the technical solution has strong realizability, which means that it has good practical application prospects.

DETAILED DESCRIPTION

The technical solution proposed by the present invention is further described below in detail in combination with the drawings and specific embodiments.

Figure 1:
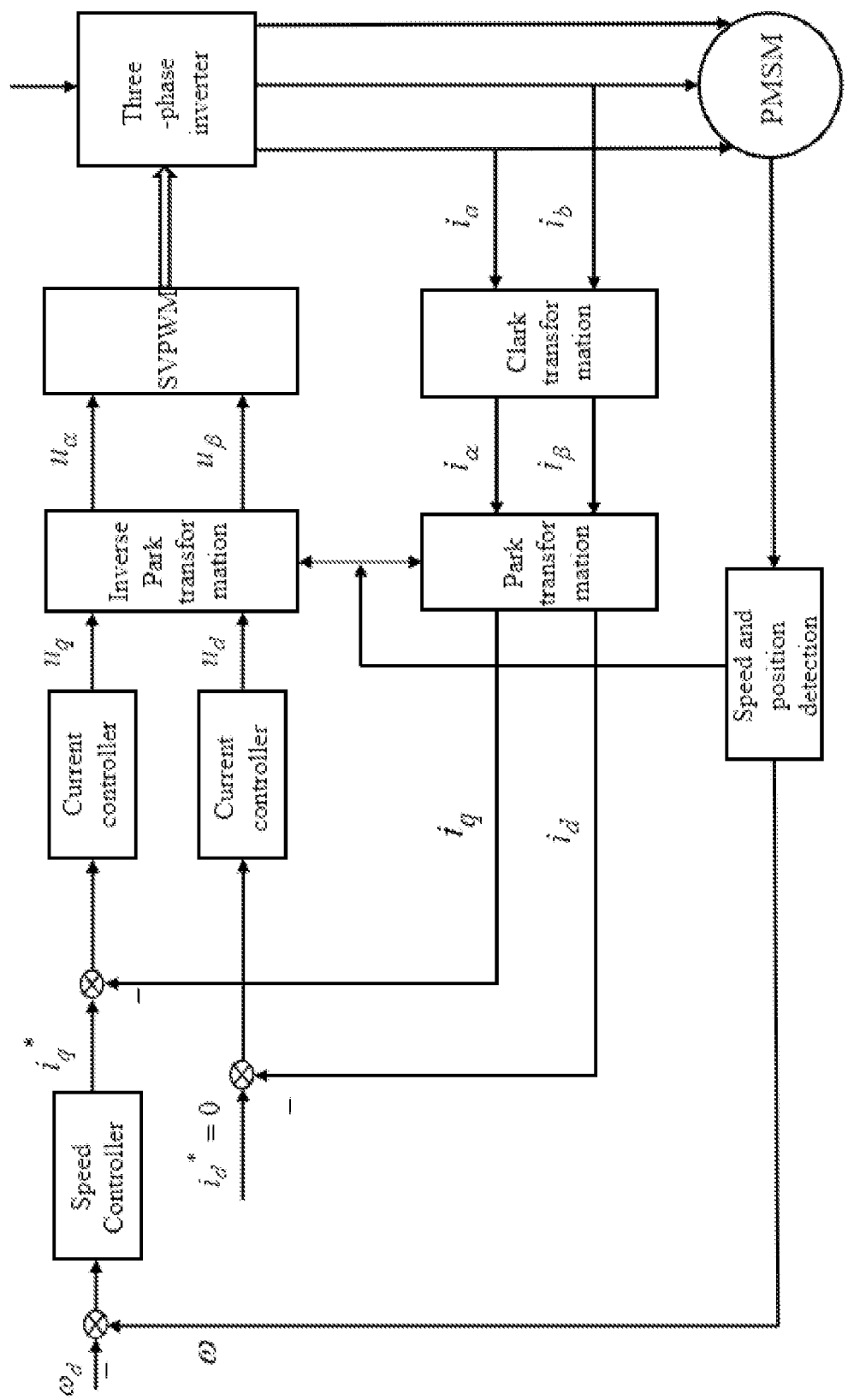
FIG. 1 is a vector control frame of a PMSM speed regulating system.
Figure 2:
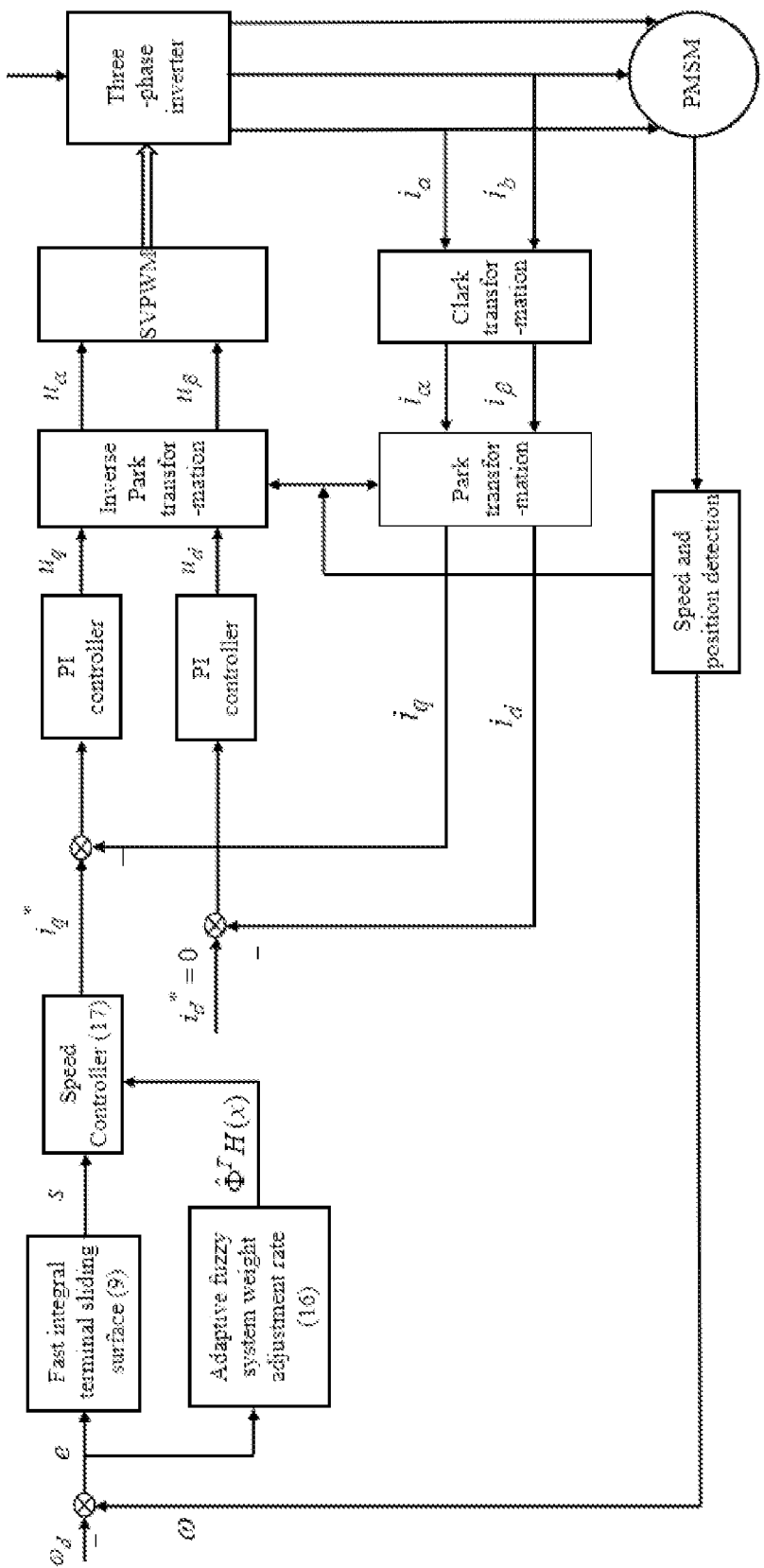
FIG. 2 is a control frame of a PMSM speed regulating system proposed by the present invention.
Figure 8:
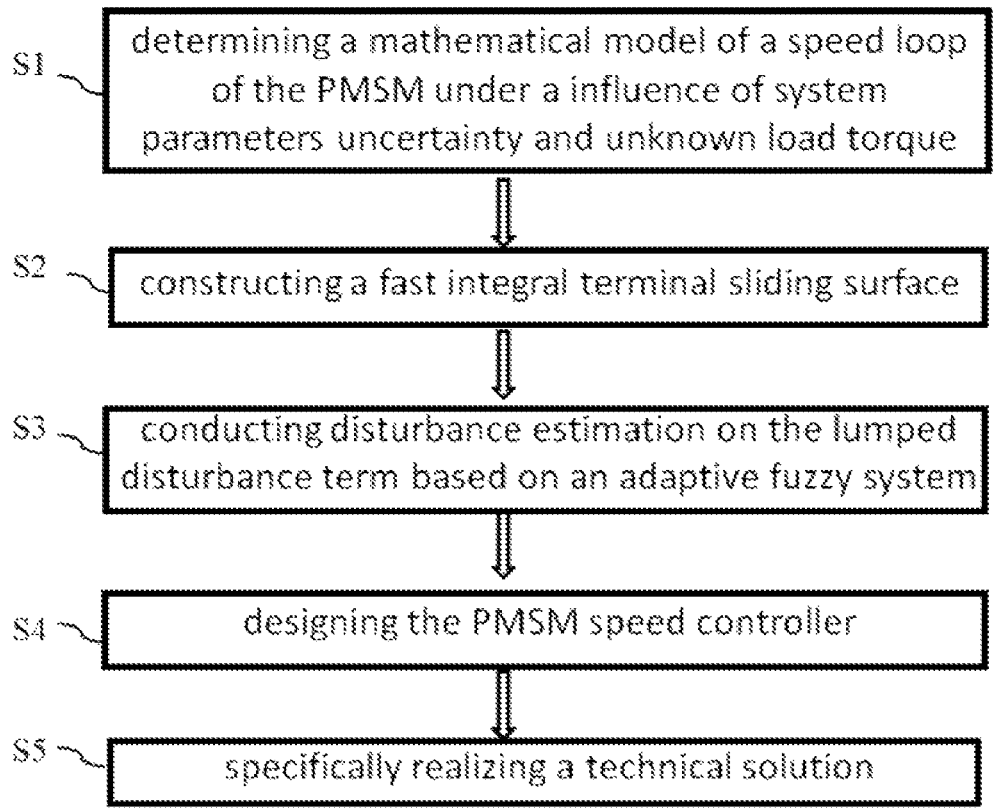
FIG. 8 is a process flow diagram of the invention.

The present embodiment discloses a finite time speed control technology for a permanent magnet synchronous motor based on a fast integral terminal sliding mode and disturbance estimation. Specific implementation modes are as follows:

The present invention is designed for speed control of a non-salient pole permanent magnet synchronous motor, and is based on a vector control frame of $i_d$=0 permanent magnet synchronous motor (PMSM) speed regulating system as shown in FIG. 1. For the convenience of the design of the controller, a cascade control structure of a speed loop and two current loops is adopted, i.e., the output of the speed loop controller is the reference current input of the current loop. The present invention mainly designs and improves the speed loop in the vector control frame shown in FIG. 1, and builds the control frame of the PMSM speed regulating system as shown in FIG. 2, FIG. 8 is a process flow diagram of the invention, The design process is introduced in detail below:

S1: Determining a mathematical model of a speed loop of the PMSM under the influence of system parameters uncertainty and unknown load torque:

with a rotor coordinate system (d–q coordinate system) as a reference coordinate system, a mathematical model of a speed loop of the non-salient pole permanent magnet synchronous motor is:

$$\dot{\omega} = \frac{K_t}{J}i_q - \frac{B}{J}\omega - \frac{T_L}{J} \quad (1)$$

where $\omega$ is motor speed; $i_q$ represents stator current of q axis; $K_t$ is a torque constant; J represents the moment of inertia; B is a viscous friction coefficient; and $T_L$ represents a load torque.

Further considering the influence of system parameters uncertainty, unknown load torque and current loop tracking error, and rewriting the mathematical model of the PMSM as:

$$\dot{\omega} = \frac{K_t}{J_n}i_q^* - \frac{B_o + \Delta B}{J_n + \Delta J}\omega + \left(\frac{K_t}{J} - \frac{K_t}{J_n}\right)i_q - \frac{T_L}{J} + \frac{K_t}{J_n}(i_q - i_q^*) \quad (2)$$

where $B_o$ and $J_n$ represent the nominal values of the viscous friction coefficient and the moment of inertia respectively; $\Delta B = B - B_o$ and $\Delta J = J - J_n$ represent deviations between true values and the nominal values of the viscous friction coefficient and the moment of inertia; and $i_q^*$ represents a reference value of the stator current of the q axis, i.e., a PMSM speed controller to be designed.

Further processing the mathematical model of the speed loop of the PMSM which considers the system disturbance to obtain:

$$\dot{\omega} = ai_q^* + d \quad (3)$$

In the formula, $$a = \frac{K_t}{J_n};$$

since the torque constant $K_t$ and the nominal value $J_n$ of the moment of inertia are known, a is a known constant coefficient; d(t) represents a lumped disturbance term of which the expression is $$d = -\frac{B_o + \Delta B}{J_n + \Delta J}\omega + \left(\frac{K_t}{J} - \frac{K_t}{J_n}\right)i_q - \frac{T_L}{J} + \frac{K_t}{J_n}(i_q - i_q^*) \quad (4)$$

S2: Constructing a fast integral terminal sliding surface defining a speed tracking error: $e = \omega - \omega_d$ (5)
where $\omega_d$ represents motor target speed.

Sliding mode control is widely used in the field of PMSM speed control because of its advantages of strong robustness and anti-disturbance capability. However, traditional sliding mode control can only realize the control effect of asymptotic convergence, and cannot ensure that the motor speed can track the target value in finite time. In terminal sliding mode control, the nonlinear item is introduced into the sliding surface and a nonlinear hyperplane is used as the sliding surface, so that the system state on the sliding surface can converge to an equilibrium point in finite time. At the same time, in order to ensure that the signals used in the proposed technical solution can be directly obtained and improve the steady-state tracking performance of the PMSM speed regulating system, the present invention selects the integral terminal sliding surface as the sliding mode. The expression of the traditional integral terminal sliding surface is as follows:

$$s = e + \beta_1 \int_0^t e^{q_1/p_1} d\sigma \quad (6)$$

where $\beta_1 > 0$ is a constant coefficient; $0 < q_1/p_1 < 1$ and $q_1$ and $p_1$ are positive odd numbers.

The convergence of the above sliding surface is analyzed below. When the speed tracking error converges to the sliding surface, i.e., s=0, the following formula holds:

$$e = -\beta_1 \int_0^t e^{q_1/p_1} d\sigma \quad (7)$$

The derivative of formula (7) is taken to obtain $$\dot{e} = -\beta_1 e^{q_1/p_1} \quad (8)$$

$0 < q_1/p_1 < 1$. Thus, when the speed tracking error is far from the equilibrium point, i.e. $|e| \gg 1$, the value of $|\dot{e}|$ will be greatly reduced. Namely, at this moment, the convergence rate of the speed tracking error e will be obviously reduced, and is lower than that of the traditional linear sliding surface, which is the disadvantage of the traditional integral terminal sliding surface.

To further increase the convergence rate of the traditional integral terminal sliding surface, the present invention proposes the following form of fast integral terminal sliding surface:

$$s = e + \alpha \int_0^t e d\sigma + \beta \int_0^t e^{q/p} d\sigma \quad (9)$$

where $\alpha, \beta > 0$, which are constant coefficients; $0 < q/p < 1$ and q and p are positive odd numbers.

Next, the convergence rate of the designed sliding surface is analyzed. When the speed tracking error converges to the sliding surface, i.e., s=0, then $$e = -\alpha \int_0^t e d\sigma - \beta \int_0^t e^{q/p} d\sigma \quad (10)$$

The derivative of the above formula is taken to obtain $$\dot{e} = -\alpha e - \beta e^{q/p} \quad (11)$$

Due to the existence of $-\alpha e$ term which provides the convergence speed that can ensure a positive correlation relation with the distance between the motor speed tracking error and the equilibrium point, when the speed tracking error is far from the equilibrium point, i.e. $|e| \gg 1$, although the convergence rate provided by $-\beta e^{q/p}$ term is small, $-\alpha e$ term will provide a large convergence rate. When the speed tracking error is close to the equilibrium point, i.e. $|e| \ll 1$, then the convergence rate provided by $-\alpha e$ term is small, but due to $0 < q/p < 1$, $-\beta e^{q/p}$ term will provide a large convergence rate. In conclusion, the fast integral terminal sliding surface designed by the present invention can ensure high convergence rate as long as the motor speed tracking error is located on the sliding surface.

The specific convergence time is provided below. The equation (11) is solved to calculate the time for the motor speed tracking error to converge to zero from reaching the sliding surface:

$$t_s = \frac{p}{\alpha(p-q)} \left( \ln\left[ \alpha e(0)^{(p-q)/p} + \beta \right] - \ln \beta \right) \quad (12)$$

S3: Disturbance estimation method based on an adaptive fuzzy system

Through product inference, weighted average and singleton fuzzifier, the output of the fuzzy system can be expressed as $$y(x) = \Phi^T H(x) \quad (13)$$

in the formula, y represents the output of the fuzzy system; $x = [x_1, x_2, \ldots, x_n]^T$ is an input vector of the fuzzy system, and n is the number of fuzzy inputs. In the technical solution proposed by the present invention, the fast integral terminal sliding surface and the speed tracking error are selected as the inputs of the fuzzy system, i.e., $x = [s, e]^T$; $\Phi^T = [\phi_1, \phi_2, \ldots, \phi_r]^T$ is an adjustable weight vector, and r is the number of fuzzy rules; $H(x) = [h_1(x), h_2(x), \ldots, h_r((x))]^T$ represents a fuzzy basis function vector, and:

$$h_i(x) = \frac{\prod_{k=1}^{n} \mu_{A_k^i}(x_k)}{\prod_{i=1}^{r} \left[ \prod_{k=1}^{n} \mu_{A_k^i}(x_k) \right]}, i = 1, \ldots, r \quad (14)$$

where $\mu_{A_k^i}(x_k)$ represents a membership function value of a fuzzy variable.

In the present invention, the lumped disturbance term d(t) defined in step S1 is estimated by the fuzzy system, and according to the universal approximation theorem of the fuzzy system, an optimal fuzzy system $\overline{\Phi}^T H(x)$ exists, so that:

$$d = \overline{\Phi}^T H(x) + \varepsilon \quad (15)$$

In the formula, $\overline{\Phi} = [\overline{\phi}_1, \overline{\phi}_2, \ldots, \overline{\phi}_r]^T$ is a weight vector at optimal approximation; $\varepsilon$ represents an estimation error which satisfies $|\varepsilon| < \rho$; $\rho > 0$ is a positive constant; and the value of $\varepsilon$ can be infinitely reduced by increasing the number of the fuzzy rules.

Since the weight vector $\overline{\Phi}$ in optimal approximation cannot be obtained directly, estimating $\overline{\Phi}$; making $\hat{\Phi}$ represent the estimated value of $\overline{\Phi}$; and based on an adaptive theory, designing the online adaptive weight adjustment rate of the fuzzy system as:

$$\dot{\hat{\Phi}} = \Gamma H(x) s \quad (16)$$

where $\Gamma \in R^{r \times r}$ is a positive definite symmetric matrix; and s represents the fast integral terminal sliding surface (9) constructed in step S2. After obtaining the estimated value $\hat{\Phi}$ of $\overline{\Phi}$ according to the above adaptive weight adjustment rate, $\hat{\Phi}^T H(x)$ can be used to estimate the lumped disturbance term d(t) online.

S4: Designing the PMSM speed controller
designing the following form of PMSM speed controller based on steps S2 and S3:

$$i_q^* = \frac{1}{a} \left[ \dot{\omega}_d - \hat{\Phi}^T H(x) - \alpha e - \beta e^{q/p} - k_1 s - k_2 \text{sign}(s) \right] \quad (17)$$

where $k_1$ and $k_2$ are positive adjustable control gains; $k_2 > l + \rho$; $l > 0$ is the upper bound of $\tilde{\Phi}^T H(x)$; i.e., $|\tilde{\Phi}^T H(x)| < l$; $\tilde{\Phi} = \overline{\Phi} - \hat{\Phi}$ represents a weight estimation error vector; the boundedness of the signal will be proved later; and sign(s) represents a signum function.

The derivative of the fast integral terminal sliding surface (9) with respect to time t is taken:

$$\dot{s} = \dot{e} + \alpha e + \beta e^{q/p} = \dot{\omega} - \dot{\omega}_d + \alpha e + \beta e^{q/p} \quad (18)$$

Further, in combination with the system mathematical model (3), the following formula can be obtained: $\dot{s} = a i_q^* + d - \dot{\omega}_d + \alpha e + \beta e^{q/p}$ (19)

The controller expression (17) is substituted into the above equation, and according to formula (15):

$$\dot{s} = \overline{\Phi}^T H(x) - \hat{\Phi}^T H(x) - k_1 s - k_2 \text{sign}(s) + \varepsilon \quad (20)$$

The stability of a closed-loop system is analyzed below according to Lyapunov method, which proves that the technical solution proposed by the present invention can control the motor speed to reach a given value in finite time and can effectively overcome the influence of system disturbance. Proof: constructing a Lyapunov function of the following form:

$$V = \frac{1}{2} s^2 + \frac{1}{2} \tilde{\Phi}^T \Gamma^{-1} \tilde{\Phi} \quad (21)$$

taking the derivative of the Lyapunov function, and combining with formulas (16) and (20) to obtain:

$$\begin{aligned} \dot{V} &= s \dot{s} + \tilde{\Phi}^T \Gamma^{-1} \dot{\tilde{\Phi}} \\ &= s \left( \overline{\Phi}^T H(x) - \hat{\Phi}^T H(x) - k_1 s - k_2 \text{sign}(s) + \varepsilon \right) - \tilde{\Phi}^T \Gamma^{-1} (\Gamma H(x) s) \\ &= -k_1 s^2 - k_2 |s| + s \varepsilon \\ &\leq k_1 s^2 - (k_2 - \rho) |s| \\ &\leq 0 \end{aligned} \quad (22)$$

according to formulas (21) and (22), obtaining that v(t) is bounded, i.e., $$V \in \zeta_\infty \quad (23)$$

From the form of V(t), it can be seen that $s, \tilde{\Phi} \in \zeta_\infty$, and further combining with formulas (5), (6) and (16), obtaining: $e, \omega, \hat{\Phi}, \dot{s}, i_q^* \in \zeta_\infty$ (24)

Namely, all the signals in the closed-loop system are bounded.

In addition, $h_i(x)$, $i=1,\ldots,r$ represents a fuzzy basis function which is a bounded function, and then $H(x)=[h_1(x), h_2(x),\ldots,h_r((x))]^T \in \zeta_\infty$;

due to $\tilde{\Phi} \in \zeta_\infty$, $\hat{\Phi}^T H(x) \in \zeta_\infty$ holds. Assuming that: $|\tilde{\Phi}^T H(x)| < l$ (25)

where $l>0$ is a positive constant.

Next, it is proved that the speed tracking error can converge to the sliding surface in finite time, that is, the time for s to converge to zero is finite.

A new Lyapunov function is designed as follows:

$$V_1 = \frac{1}{2}s^2 \quad (26)$$

By taking the derivative of the Lyapunov function, in combination with formulas (20) and (25), it can be obtained that $$\begin{aligned}\dot{V}_1 &= s\dot{s} \quad (27)\\ &= s\left(\tilde{\Phi}^T H(x) - \hat{\Phi}^T H(x) - k_1 s - k_2 \text{sign}(s) + \varepsilon\right)\\ &= -k_1 s^2 - k_2|s| + s\tilde{\Phi}^T H(x) + s\varepsilon\\ &\leq -k_1 s^2 - (k_2 - \rho - l)|s|\\ &\leq 0 - \lambda|s|\end{aligned}$$

In the formula, $\lambda = k_2 - \rho - l$. Further, according to formulas (26) and (27), it can be obtained that $$\dot{V}_1 \leq -\lambda\sqrt{2V_1(s)} \quad (28)$$

It is assumed that the system state will reach the sliding surface at $t=t_o$, i.e., $V_1(t_o)=0$; then the definite integral of formula (28) at time $0-t_o$ can be calculated:

$$\sqrt{V_1(t_o)} - \sqrt{V_1(0)} \leq -\frac{\sqrt{2}}{2}t_o \Rightarrow t_o \leq \frac{1}{\lambda}\sqrt{2V_1(0)} \quad (29)$$

That is $$t_o \leq \frac{1}{\lambda}|s(0)| \quad (30)$$

where s(0) represents the value of the fast integral terminal sliding surface s constructed in step S2 at time of 0.

Further, in combination with the time $t_s$ taken for the motor speed tracking error to converge to zero on the designed fast integral terminal sliding surface obtained in step S2, it is obtained the time that the motor speed tracking error converges to zero from an initial state, i.e., the time $t_r$ taken for the motor to reach the target speed, which satisfies:

$$t_r = t_o + t_s \leq \frac{1}{\lambda}|s(0)| + \frac{p}{\alpha(p-q)}\left(\ln\left[\alpha e(0)^{(p-q)/p} + \beta\right] - \ln \beta\right) \quad (31)$$

Then, through the above rigorous theoretical analysis, it proves that the technical solution proposed by the present invention can enable the motor speed to reach a target value in finite time and can also effectively overcome the influence of system disturbance.

S5: Specifically realizing the technical solution

Through steps S1-S4, the control frame of the PMSM speed regulating system shown in FIG. 2 can be built. The specific realization is introduced in detail here. Firstly, measuring the motor speed ω in real time through a sensor installed in the PMSM, and after obtaining a motor speed signal ω, making a difference between the signal and the motor target speed $\omega_d$ to obtain a speed tracking error e; after obtaining e, further obtaining the value of the fast integral terminal sliding surface s; meanwhile, based on step S3, obtaining a disturbance estimation value $\hat{\Phi}^T H(x)$ outputted by the adaptive fuzzy system; substituting the speed tracking error e, the fast integral terminal sliding surface s and the disturbance estimation value $\hat{\Phi}^T H(x)$ into the PMSM speed controller (17) given in step S4, and using the controller as a speed loop controller under a PMSM vector control frame to generate a reference value $i_q^*$ of stator current of the q axis. In a current loop, obtaining the voltage in the d-q coordinate system according to the input stator current reference value using a classical PI controller, obtaining a voltage signal in a static coordinate system through inverse Park transformation, then generating a corresponding duty cycle through a SVPWM algorithm, and obtaining a switch signal of a three-phase inverter; outputting PMSM three-phase stator voltage by the three-phase inverter, and then controlling the motor speed to track the target speed to realize the whole motor speed regulation process.

Figure 3:
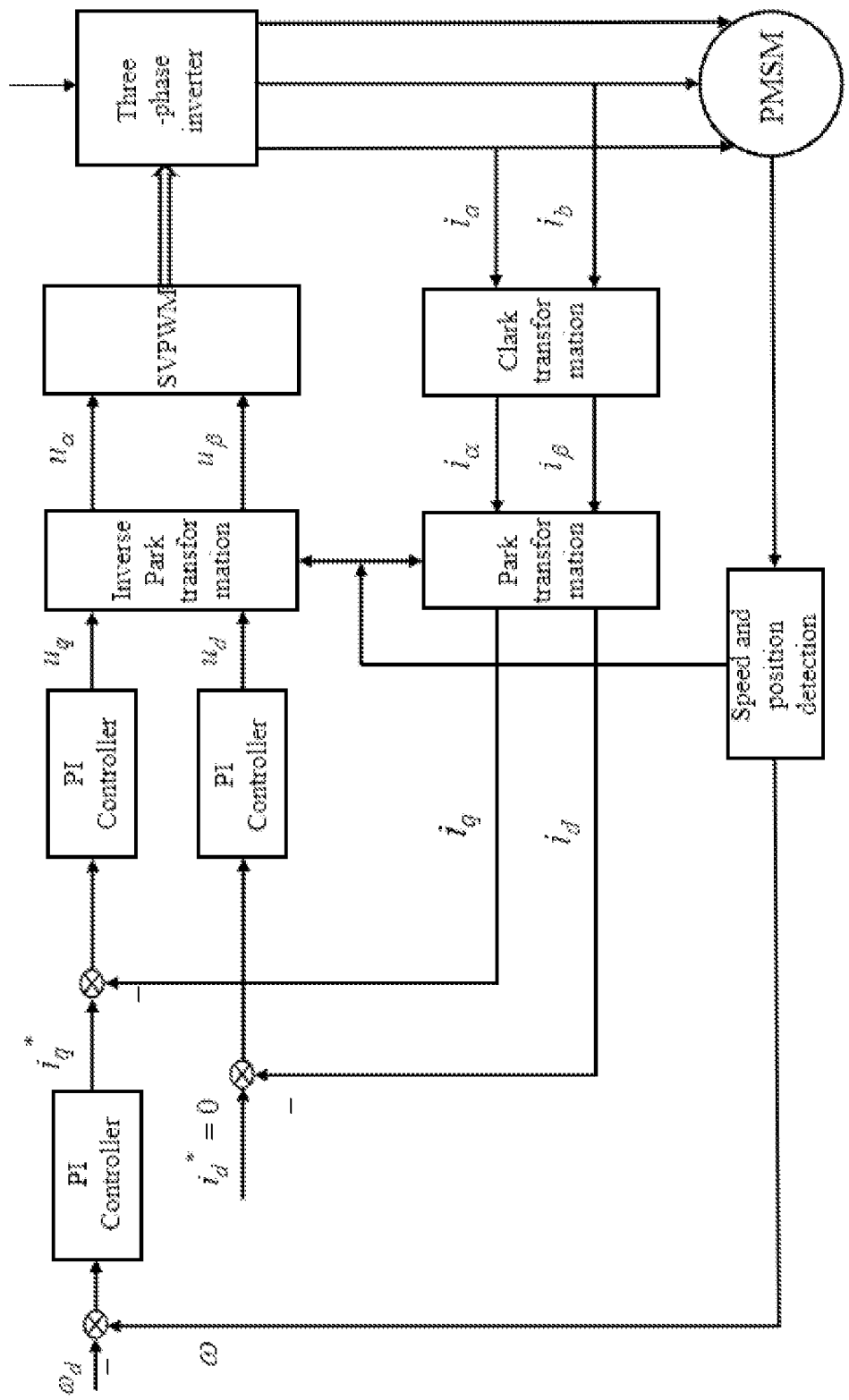
FIG. 3 is a vector control frame of a PI algorithm-based PMSM speed regulating system commonly used in industry.

In order to further verify the effectiveness and advancement of the proposed technology, the present invention compares the control performance with that of the "vector control frame of the PI algorithm-based PMSM speed regulating system" as the most commonly used industrial control frame through simulation. FIG. 3 shows the vector control frame of the PI algorithm-based PMSM speed regulating system, which is referred to as "PI algorithm" in later illustration. The PI algorithm is used in the speed loop and the current loop. This control solution has the advantages of convenient adjustment and easy realization. Thus, the PI algorithm is most widely used in the industrial field.

Simulation 1: comparison of speed regulation performance under ideal conditions

Figure 4:
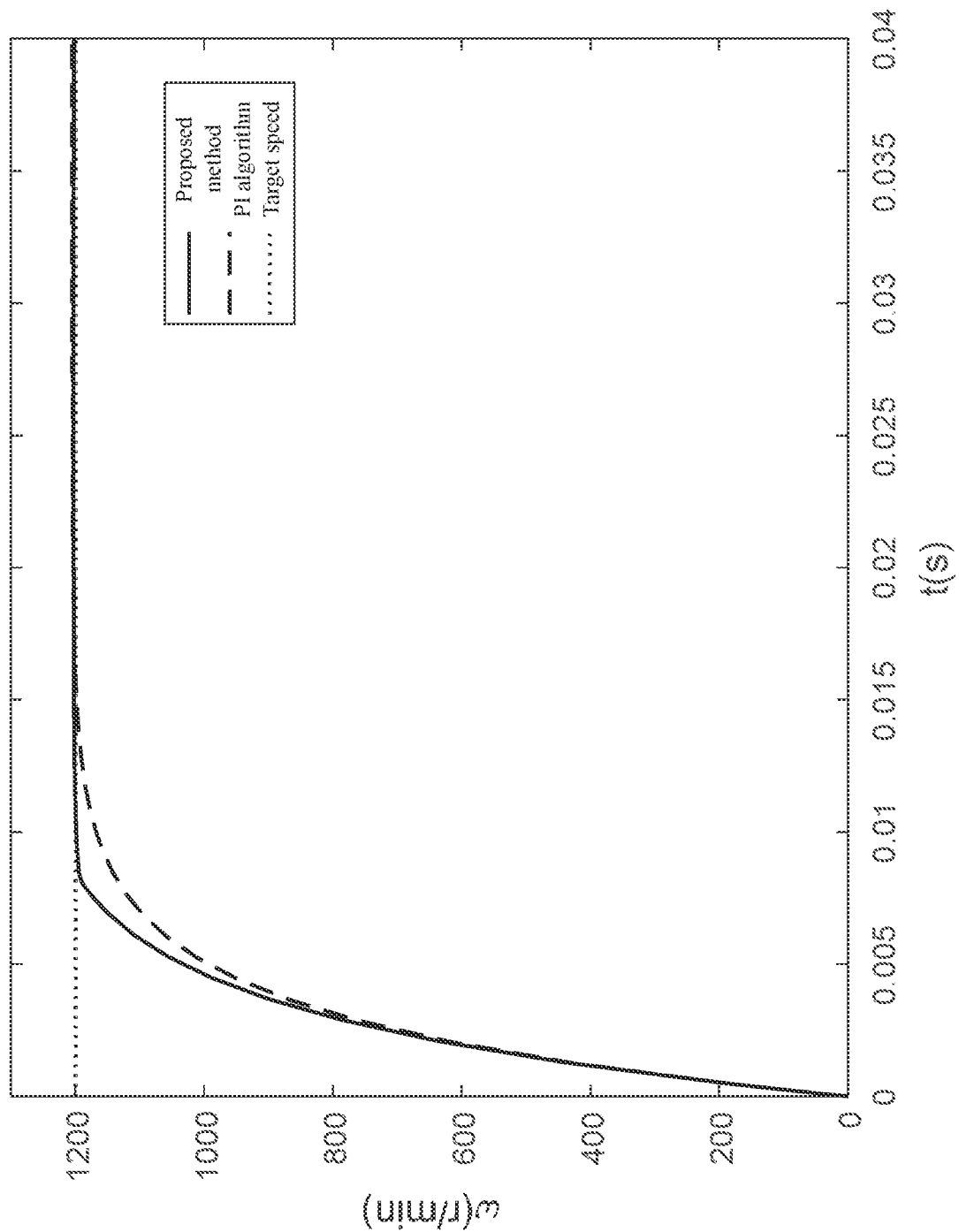
FIG. 4 is a comparison diagram of speed curves under ideal conditions by using the proposed method and PI algorithm.
Figure 5:
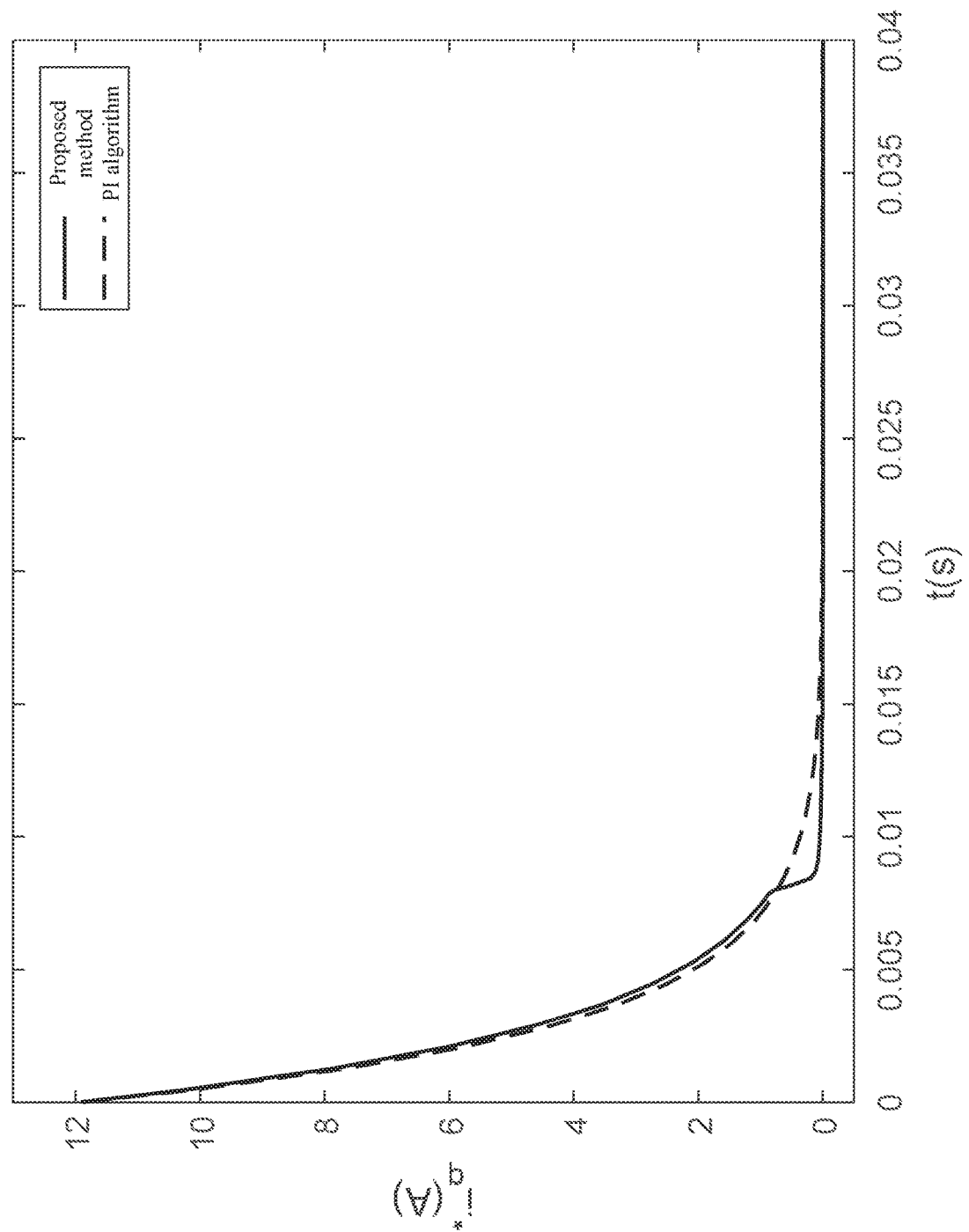
FIG. 5 shows $i_q^*$ response curves under ideal conditions by using the proposed method and PI algorithm.

Firstly, the speed regulation performance of the proposed technical solution and the PI algorithm is compared under ideal conditions, that is, without parameters uncertainty and load torque disturbance. System parameters are set as follows: J=3.78=$10^{-4}$ kg·m$^2$, B=1.74×$10^{-5}$ N·m·s/ad, $K_t$=1.4 N·m/A; and at the same time, the motor target speed is set as $\omega_d$ 1200 r/min Simulation results are shown in FIGS. 4-5. FIG. 4 is a comparison diagram of speed curves by using the proposed method and the PI algorithm; and FIG. 5 shows $i_q^*$ response curves by using two different solutions. In combination with FIG. 4 and FIG. 5, under ideal conditions, the proposed method only needs 0.0075 s to make the motor reach the given speed, while the PI algorithm takes about 0.015 s, which is about twice as long as the proposed method. At the same time, it can be seen that the steady-state error of the PI algorithm is significantly greater than that of the proposed method. The results of simulation 1 show that compared with the PI algorithm, the technical solution of the present invention has higher response speed and higher control accuracy.

Figure 6:
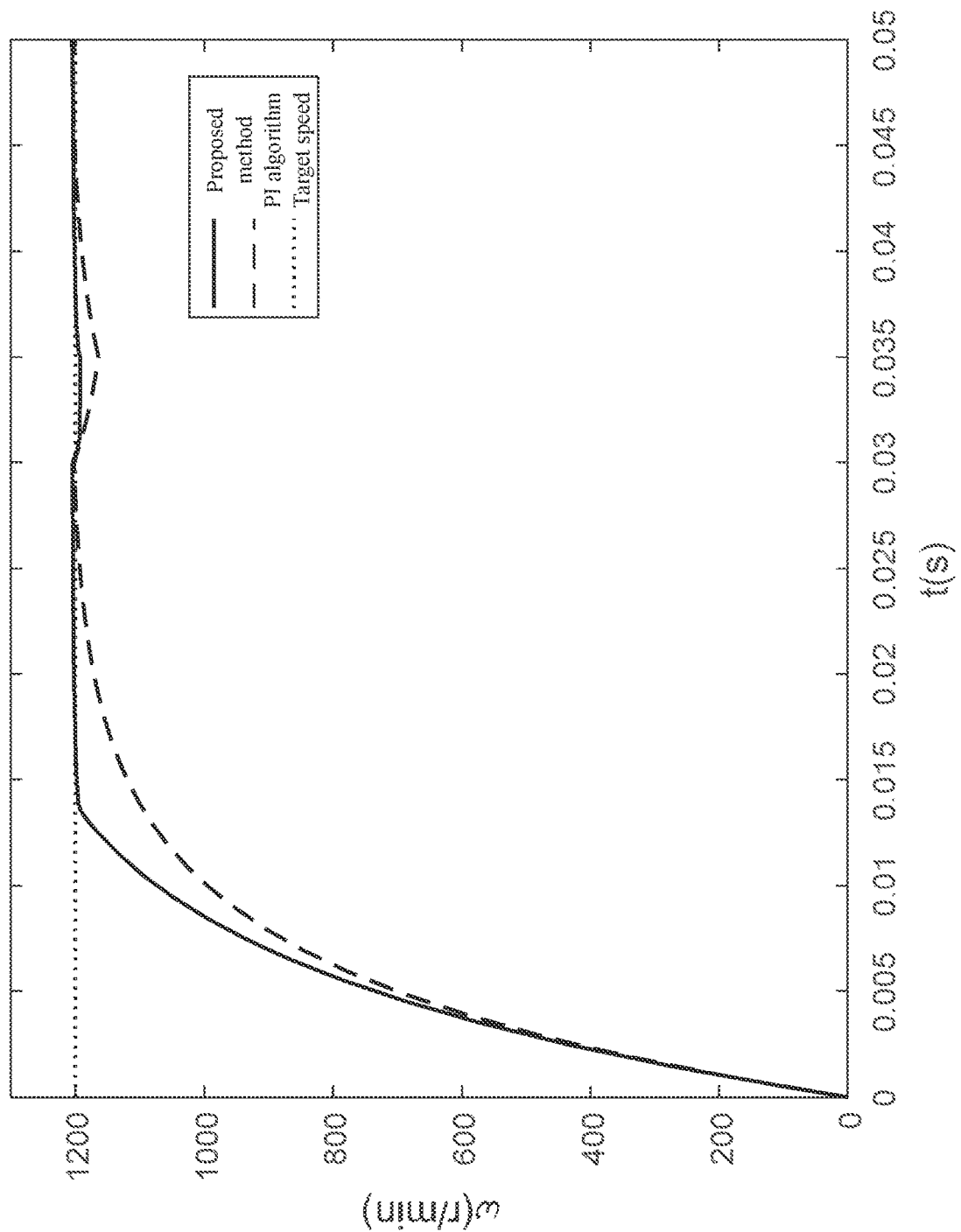
FIG. 6 is a comparison diagram of speed curves under the influence of disturbance by using the proposed method and PI algorithm.
Figure 7:
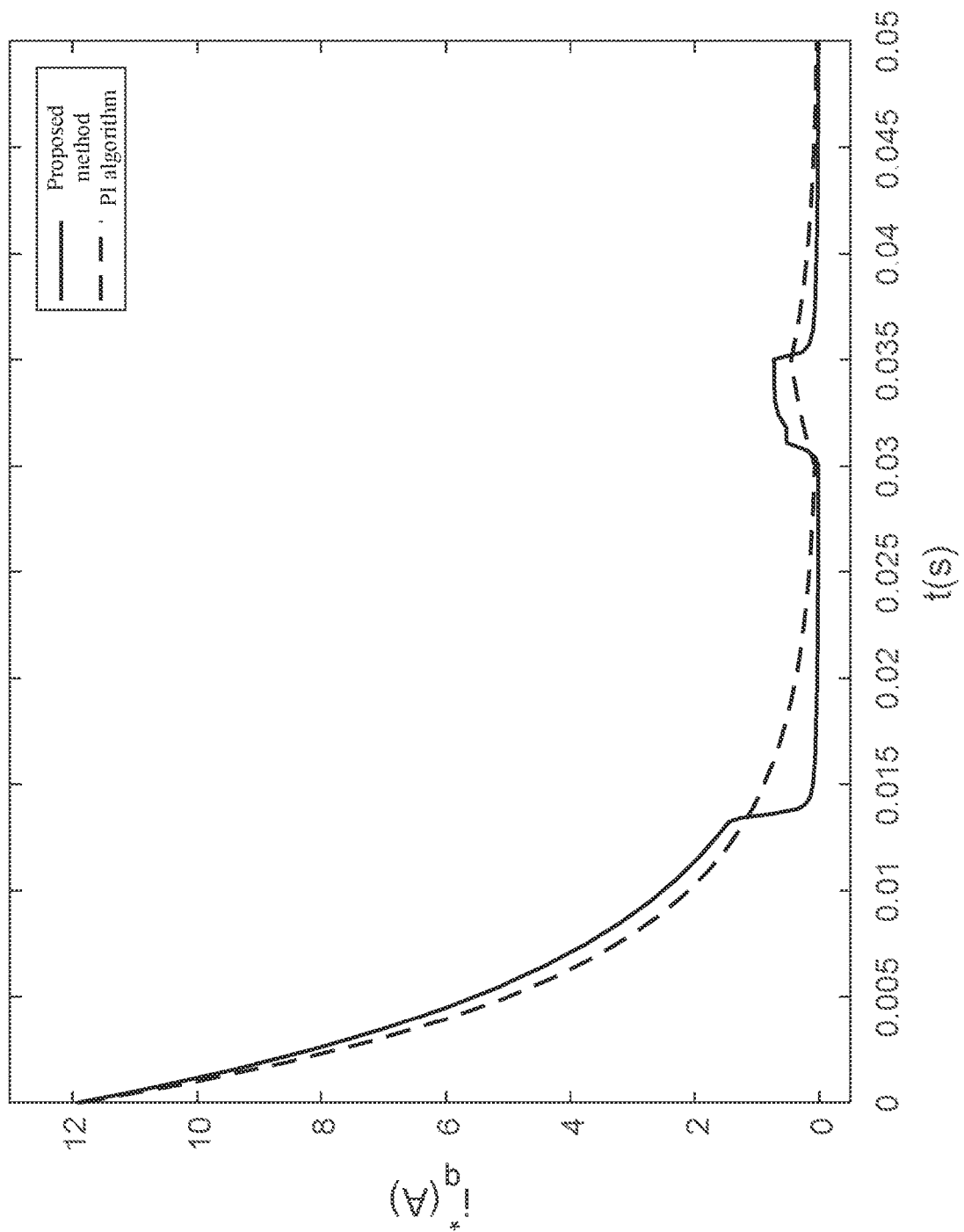
FIG. 7 shows $i_q^*$ response curves under the influence of disturbance by using the proposed method and PI algorithm.

Simulation 2: comparison of speed regulation performance under the influence of disturbance Further, in order to verify and compare the anti-disturbance capability of the proposed method and the PI algorithm, the influence of internal and external disturbances including system parameters uncertainty and load torque change is comprehensively considered in simulation 2, the motor moment of inertia is adjusted to twice of that in simulation 1, and the viscous friction coefficient is adjusted to 5 times of the original value, i.e., J=2×3.78×10$^{-4}$ kg·m$^2$, B=5×1.74×10$^{-5}$ N·m·s/rad; and other system parameters are unchanged. Meanwhile, the controller parameters of the proposed method in the present invention and the PI algorithm are also kept the same as those in simulation 1. In addition, in order to simulate the influence of the unknown load torque, at 0.03 s during simulation, 0.5 N·m load torque is applied, and the load torque is removed at 0.035 s. Simulation results are shown in FIGS. 6-7. FIG. 6 is a comparison diagram of speed curves by using the proposed method and the PI algorithm; and FIG. 7 shows $i_q$* response curves by using two different solutions. In combination with FIG. 6 and FIG. 7, under the influence of disturbance, the proposed method can still ensure good dynamic performance and steady-state performance, and the motor accurately reaches the given speed at about 0.012 s. Accordingly, the PI algorithm takes about 0.03 s to adjust the motor to the target speed, and the time used is nearly 3 times that of the proposed method in the present invention. More importantly, when the load torque suddenly changes, the motor speed under the control of the PI algorithm obviously fluctuates, and the decline range is far greater than the decline range of the speed of the method proposed by the present invention. At the same time, compared with the PI algorithm, the proposed method in the present invention can eliminate the influence of disturbance more quickly and make the motor speed return to the target value smoothly in a very short time. The results of simulation 2 show that compared with the PI algorithm, the proposed method of the present invention has obvious anti-disturbance performance advantage, can effectively overcome the influence of internal and external system disturbance, and can also ensure the control accuracy and rapidity of the motor speed regulating system.

In conclusion, the results of simulation 1 and simulation 2 show that compared with the PI algorithm control solution commonly used in industry, the technical solution proposed by the present invention has higher response speed and higher control accuracy, and can accurately adjust the motor speed to the given value within a shorter time. At the same time, the proposed technical solution has advantages in anti-disturbance capability and can effectively overcome the influence of disturbance including system parameters uncertainty and unknown load torque, which means that the present invention is more practical and suitable for application in actual systems.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A finite time speed control method for a permanent magnet synchronous motor (PMSM) based on a fast integral terminal sliding mode and disturbance estimation, comprising the following steps:

S1: determining a mathematical model of a speed loop of the PMSM under a influence of system parameters uncertainty and unknown load torque;

in a d–q coordinate system, a mathematical model of a speed loop of a non-salient pole permanent magnet synchronous motor is:

$$\dot{\omega} = \frac{K_t}{J} i_q - \frac{B}{J} \omega - \frac{T_L}{J}$$

where ω is motor speed; $i_q$ represents stator current of q axis; $K_t$ is a torque constant; J represents a moment of inertia; B is a viscous friction coefficient; and $T_L$ represents a load torque;

considering the influence of system parameters uncertainty, unknown load torque and current loop tracking error, the mathematical model of the speed loop of the PMSM is:

$$\dot{\omega} = \frac{K_t}{J_n} i_q^* - \frac{B_o + \Delta B}{J_n + \Delta J} \omega + \left(\frac{K_t}{J} - \frac{K_t}{J_n}\right) i_q - \frac{T_L}{J} + \frac{K_t}{J_n}(i_q - i_q^*)$$

in a formula, $B_o$ and $J_n$ represent nominal values of a viscous friction coefficient and the moment of inertia respectively; $\Delta B = B - B_o$ and $\Delta J = J - J_n$ represent deviations between true values and the nominal values of the viscous friction coefficient and the moment of inertia; $i_q^*$ represents a reference value of the stator current of the q axis, a PMSM speed controller to be designed;

after processing the mathematical model of the speed loop of the PMSM which considers the system disturbance, obtaining:

$$\dot{\omega} = a i_q^* + d$$

in the formula, d(t) represents a lumped disturbance term; α is a known constant coefficient;

S2: constructing a fast integral terminal sliding surface:

firstly, defining a speed tracking error: $e = \omega - \omega_d$, where $\omega_d$ represents motor target speed;

then, designing the fast integral terminal sliding surface as: $s = e + \alpha \int_0^t e \, d\sigma + \beta \int_0^t e^{q/p} d\sigma$; where α, β>0 which are constant coefficients; 0<q/p<1; and q and p are positive odd numbers;

when the tracking error of the motor speed converges to a sliding surface, s=0, $$e = -\alpha \int_0^t e \, d\sigma - \beta \int_0^t e^{q/p} d\sigma;$$

solving a above equation to obtain time for a tracking error of the motor speed to converge to zero from reaching the sliding surface:

$$t_s = \frac{p}{\alpha(p-q)} \left( \ln\left[\alpha e(0)^{(p-q)/p} + \beta\right] - \ln \beta \right)$$

S3: conducting disturbance estimation on the lumped disturbance term based on an adaptive fuzzy system:

estimating a lumped disturbance term d(t) defined in step S1 by the fuzzy system, and according to a universal approximation theorem of the fuzzy system, an optimal fuzzy system $\bar{\Phi}^T H(x)$ exists, so that:

$$d = \bar{\Phi}^T H(x) + \varepsilon$$

in the formula, $\bar{\Phi} = [\bar{\phi}_1, \bar{\phi}_2, \ldots, \bar{\phi}_r]^T$ is a weight vector at optimal approximation, and r is the number of fuzzy rules; ε represents an estimation error which satisfies $|\varepsilon|<\rho$; $\rho>0$ is a positive constant; the value of $\varepsilon$ can be infinitely reduced by increasing the number of the fuzzy rules; $x=[x_1,x_2,\ldots,x_n]^T$ is an input vector of the fuzzy system, and n is the number of fuzzy inputs;

selecting a fast integral terminal sliding surface and a speed tracking error as the inputs of the fuzzy system, $x=[s,e]^T$, with $H(x)=[h_1(x),h_2(x),\ldots,h_r((x))]^T$ representing a fuzzy basis function vector, and:

$$h_i(x) = \frac{\prod_{k=1}^{n}\mu_{A_k^i}(x_k)}{\sum_{i=1}^{r}\left[\prod_{k=1}^{n}\mu_{A_k^i}(x_k)\right]}, i = 1, \ldots, r$$

where $\mu_{A_k^i}(x_k)$ represents a membership function value of a fuzzy variable;

since a weight vector $\overline{\Phi}$ in optimal approximation cannot be obtained directly, estimating $\overline{\Phi}$; making $\hat{\Phi}$ represent the estimated value of $\overline{\Phi}$; and based on an adaptive theory, designing a online adaptive weight adjustment rate of the fuzzy system as:

$\dot{\hat{\Phi}}=\Gamma H(x)s$ where $\Gamma \in R^{r \times r}$ is a positive definite symmetric matrix; s represents a fast integral terminal sliding surface constructed in step S2;

after obtaining the estimated value $\hat{\Phi}$ of $\overline{\Phi}$ according to the above adaptive weight adjustment rate, using $\hat{\Phi}^T H(x)$ to estimate the lumped disturbance term d(t) online;

S4: designing the PMSM speed controller:

designing a following form of PMSM speed controller based on steps S2 and S3:

$$i_q^* = \frac{1}{a}\left[\dot{\omega}_d - \hat{\Phi}^T H(x) - \alpha e - \beta e^{q/p} - k_1 s - k_2 \text{sign}(s)\right]$$

in the formula, $k_1$ and $k_2$ are positive adjustable control gains; $k_2 > 1+\rho$; $l>0$ is a upper bound of $\hat{\Phi}^T H(x)$, $|\hat{\Phi}^T H(x)| < l$; $\tilde{\Phi}=\overline{\Phi}-\hat{\Phi}$ represents a weight estimation error vector; and sign(s) represents a signum function;

based on the above PMSM speed controller, making the speed tracking error converge to the sliding surface in time $t_o$, with $t_o$ satisfying a following relational expression:

$$t_o \leq \frac{1}{\lambda}|s(0)|$$

in a formula, $\lambda=k_2-\rho-1$, which represents a constant coefficient; and s(0) represents the value of the fast integral terminal sliding surface s constructed in step S2 at time of 0;

S5: specifically realizing a technical solution:

5.1) firstly, measuring the motor speed $\omega$ in real time through a sensor installed in the PMSM, and after obtaining a motor speed signal $\omega$, making a difference between the signal and the motor target speed $\omega_d$ to obtain a speed tracking error e; after obtaining e, further obtaining the value of the fast integral terminal sliding surface s; and meanwhile, based on step S3, obtaining a disturbance estimation value $\hat{\Phi}^T H(x)$ outputted by the adaptive fuzzy system;

5.2) secondly, substituting a speed tracking error e, the fast integral terminal sliding surface s and the disturbance estimation value $\hat{\Phi}^T H(x)$ into the PMSM speed controller given in step S4, and using the controller as a speed loop controller under a PMSM vector control frame to generate a reference value $i_q^*$ of stator current of the q axis;

5.3) in a current loop, obtaining a voltage in the d–q coordinate system according to the input stator current reference value using a classical PI controller, obtaining a voltage signal in a static coordinate system through inverse Park transformation, generating a corresponding duty cycle, and obtaining a switch signal of a three-phase inverter; outputting PMSM three-phase stator voltage by the three-phase inverter, and then controlling the motor speed to track the target speed to realize the whole permanent magnet synchronous motor speed regulation process.

2. The finite time speed control method for the PMSM based on the fast integral terminal sliding mode and disturbance estimation according to claim 1, wherein the finite time speed control method for the PMSM is adopted so that a time used in a whole motor speed regulation process is finite, and the finite time tracking of motor speed can be realized; combining with a time $t_s$ taken for the motor speed tracking error to converge to zero on the designed fast integral terminal sliding surface obtained in step S2 and the time $t_o$ taken for the motor speed tracking error to converge to the sliding surface obtained in step S4, obtaining the time for the motor speed tracking error converges to zero from an initial state, i.e., time $t_r$ taken for the motor to reach the target speed, which satisfies:

$$t_r = t_o + t_s \leq \frac{1}{\lambda}|s(0)| + \frac{p}{\alpha(p-q)}\left(\ln\left[\alpha e(0)^{(p-q)/p} + \beta\right] - \ln \beta\right).$$

* * * * *